United States Patent Office 3,061,245
Patented Oct. 30, 1962

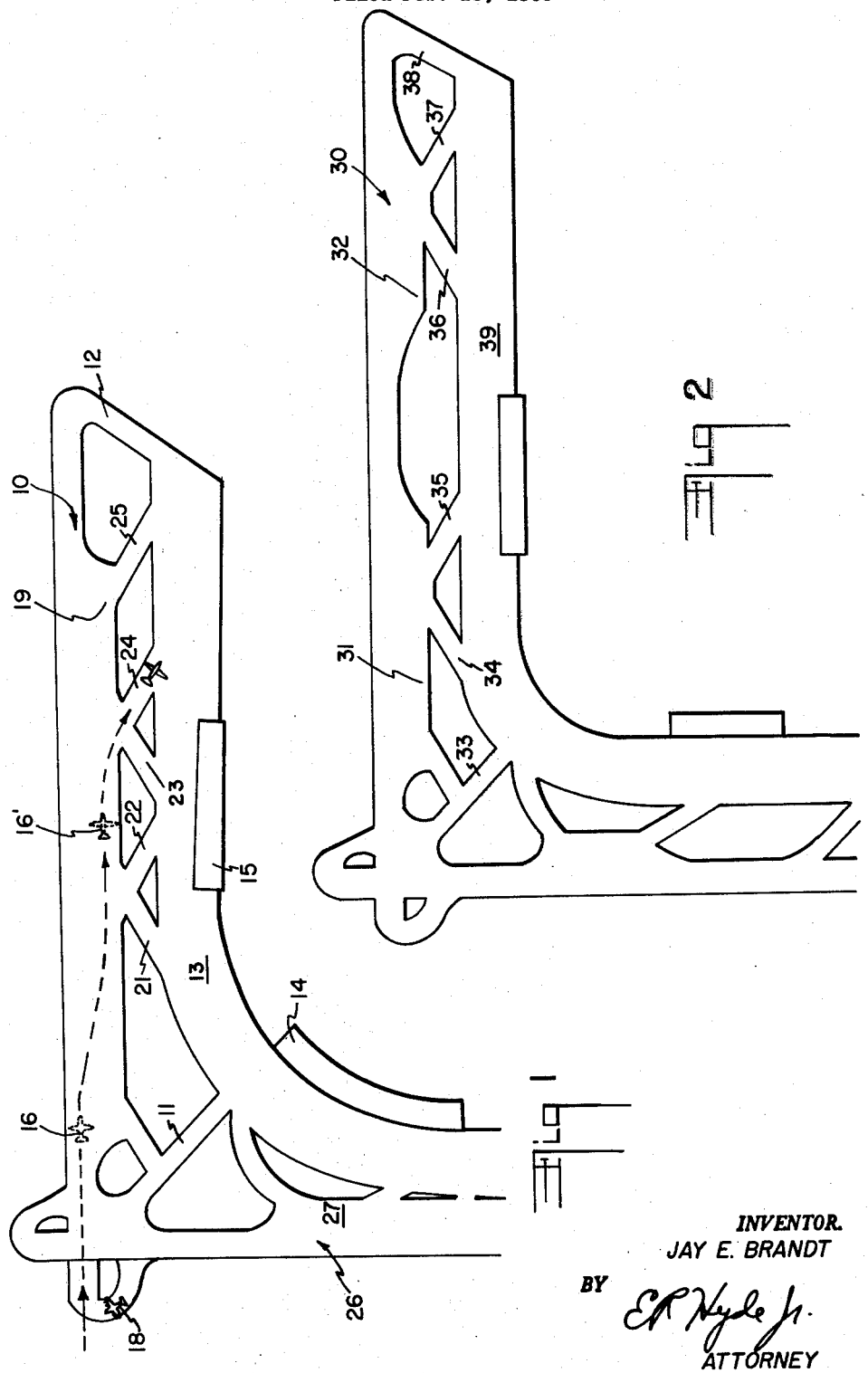

3,061,245
AIRFIELD RUNWAY CONSTRUCTION
AND DESIGN
Jay E. Brandt, Wilton, Conn., assignor of one-half to
John S. Woodard
Filed Feb. 15, 1960, Ser. No. 8,733
5 Claims. (Cl. 244—114)

The present invention relates to airfields and more particularly to a novel airfield runway design and construction.

With the recent growth of flying activity, it has become increasingly apparent that many of the major airfields are inadequate to handle the large volume of airplane traffic. This is particularly true of the airfields located in and near major cities where flight schedules are crowded and the limiting factor in the traffic volume is the facilities for landing, taking off and clearing the runway. One of the critical factors in the volume of traffic an airfield can handle is the time it takes for a landing aircraft to clear the runway. A disadvantage of present runway designs is that after a plane has landed, it must stay on the runway until its speed is reduced to a point that permits a turnoff onto a taxiway. During this period other planes will be waiting to take off or land. After a landed aircraft has reduced its speed so that it can turn off the runway, it must, nevertheless continue until a taxi strip is reached. Because of these factors, the airports having a heavy traffic schedule will often have lengthy departure delays and landing aircraft will occasionally have to go around while a preceding plane clears the runway. It is to these and other disadvantages of present runway designs that this invention is directed.

Accordingly, it is a primary object of the present invention to provide a new and improved airfield runway design and construction.

Another object of the present invention is to provide an airfield runway construction that permits landing planes to quickly and conveniently leave the path of succeeding planes that are landing and taking off.

Another object of the present invention is to provide a runway design and construction that will permit an airfield to handle a greater volume of traffic.

Another object of the present invention is to provide an airfield runway design that avoids many of the hazards and dangers of present designs.

Another object of the present invention is to provide a runway design wherein the need for the pilot to brake the plane too hard or taxi too fast in order to leave the runway at a predetermined point is eliminated.

A further object of the present invention is to provide an airfield runway design that eliminates the need to quickly leave a runway at predetermined taxioff points.

A still further object of the present invention is to provide a runway design and construction that can be added to existing airfield runways at minimum cost and construction modification.

A still further object of the present invention is to provide an airfield runway design wherein present airfields can be modified with a minimum increase in land requirements.

In accordance with the above and other objects, the present invention provides a runway with an enlarged or widened area along a portion of the length thereof. Thus an aircraft that has landed need not stay in the path of succeeding planes until a taxiway leading off the runway is reached but may immediately pull over onto the widened portion of the runway thus clearing the main path. The widened portion may extend a substantial distance along the runway so that the landed plane can immediately commence to get out of the way of other planes.

The invention will be more fully understood by the following description of a specific embodiment thereof considered with the drawings in which;

FIG. 1 is a plan view of a portion of an airfield illustrating a runway design of the present invention;

FIG. 2 is a modification of the runway design of FIG 1.

Referring now to the drawings, numeral 10 indicates an airfield runway which by way of example may be 6,000 feet long and 200 feet wide. Taxiways 11 and 12 join the runway 10 at the extreme ends thereof and connect to a ramp 13 adjacent buildings 14 and 15 which may be hangers for the planes or passenger terminal buildings. For purposes of description, it may be assumed that airplanes are landing on runway 10 from the direction from left to right. It should be understood that safety precautions and regulations dictate that only one plane may be in motion on a runway at a time. Thus when an aircraft such as 16 which is landing has touched the runway 10, the next succeeding plane that is prepared to land or ready to take off such as plane 18 may not continue until plane 16 is clear of the runway. The landed plane may continue the entire length of the runway and clear by way of taxi strip 12. Alternatively, many runways of prior design contained intermediate taxiways whereat planes could leave the runway. However, these intermediate taxiways present certain distinct disadvantages. For example, it is necessary for the pilot to first bring the plane to a speed low enough to take the turn at the taxiway, the taxiways could easily be missed because the pilot is concerned with a large number of factors incident to landing. The runway of the present construction includes a widened center portion 19 that permits a plane to immediately turn off the main portion of the runway 10 and thereby clear the way for other planes to land or take off. Leading from the widened portion 19 is a plurality of taxiways 21, 22, 23, 24, and 25 which join the runway to the ramp 13.

The widened center portion 19 is a particularly novel feature of the present invention. By way of example, the length of the widened portion measured longitudinally of the runway may be 4,000 feet or approximately two thirds of runway 10. The width of area 19 may be 200 feet or equal to the width of the runway.

Now consider aircraft 16 which has just landed. As soon as it has touched down it can promptly commence to drift off toward its right and onto area 19 in the position shown as 16'. Thus other aircraft such as 18 may be cleared to take off. Thus it is readily apparent that with the novel construction and design of the present invention, an aircraft may propmtly clear the runway with the result that a greater volume of traffic may be handled. There is no chance that the landing plane will miss intermediate turn off taxiways as in prior and presently known airfields for the reason that the landed plane does not have to turn off at predetermined points but has a wide area 19 within which to drift off the landing and take-off portion. Thus the next plane can promptly land or take off without waiting for the first plane to turn off on a taxiway. In addition to the increased volume of traffic that can be handled, it is seen that the pilot need not concentrate on the turn off taxiways but can merely drift over while concerning himself with the large number of other necessary functions.

A complete airfield will, of course, have a number of runways, generally three or more disposed at angles to each other. The present invention contemplates that each of the principle runways will have a widened center portion such as 19 associated with runway 10. FIG. 1 shows an additional runway 26 having a widened portion 27. Referring now to FIG. 2, there is shown a modification of the runway design of the present invention. A runway 30 has two widened portions 31, 32 which permit landing planes to quickly leave the main runway path. A series of taxiways 33, 34, 35, 36, 37, and 38 join the runway with the ramp 39. It may be noted that taxiways 34—37 of FIG. 2 and 21—25 of FIG. 1 are disposed at an oblique angle with the longitudinal axis of the runway. This arrangement permits a plane to turn onto the taxiway at a higher speed than would ordinarily be possible were the taxiways disposed perpendicular to the runway.

Although the present invention has been described with respect to specific embodiments thereof, it is understood that this is not to be considered limiting the scope of the invention as set forth in the appended claims.

I claim:

1. An airfield construction arrangement adapted to facilitate the rapid landing and take-off of airplanes comprising a runway, said runway including a first portion of substantially uniform width adapted to provide a path for airplanes to land and take off, a second elongated portion contiguous with said first portion along a longitudinal side thereof for a major portion of the distance of the first portion thereby providing a widened area of the runway extending less than the full length of the runway so that planes landing on the first runway portion can promptly drift laterally on to the widened second portion of the runway, the longitudinal axis of said second elongated runway portion being parallel to the axis of said first portion, a plurality of taxiways leading from the said second runway portion, said taxiways being disposed at oblique angles to the longitudinal axis of said runway whereby airplanes on the said second runway portion may turn off while still traveling at a substantial speed.

2. An airfield runway system adapted to facilitate the rapid landing and take-off of airplanes comprising a runway, said runway including a first portion of substantially uniform width and serving as an area for airplanes to land and take off, a second elongated portion contiguous with said first portion along a longitulinal side thereof for a major portion of the distance of the first portion thereby providing a widened area of the runway extending less than the full length of said first portion so that planes landing on the first portion can promptly drift laterally on to the widened second portion of the runway, said second portion being disposed centrally with respect to the longitudinal length of the first portion, a non-runway area at each end of said widened portion adjoining the said longitudinal side of the first portion, said non-runway areas being incompatible with aircraft, landing, take-offs and taxiing.

3. An airfield runway system adapted to facilitate the rapid landing and take-off of airplanes comprising a runway, said runway including a first portion of substantially uniform width and serving as an area for airplanes to land and take off, a second elongated portion contiguous with said first portion along a longitudinal side thereof for a major portion of the distance of the first portion thereby providing a widened area of the runway extending less than the full length of said first portion so that planes landing on the first portion can promptly drift laterally on to the widened second portion of the runway, said second portion being disposed centrally with respect to the longitudinal length of the first portion, a non-runway area at each end of said widened portion adjoining the said longitudinal side of the first portion, said non-runway areas being incompatible with aircraft, landing, take-offs and taxiing, a plurality of taxiways leading from the said second runway portion, said taxiways being disposed at oblique angles to the longitudinal axis of said runway whereby airplanes on the said second runway portion may turn off while still traveling at a substantial speed.

4. An airfield runway system adapted to facilitate the rapid landing and take-off of airplanes comprising a runway, said runway including a first portion of substantially uniform width and serving as an area for airplanes to land and take off, a second elongated portion contiguous with said first portion along a longitudinal side thereof for a major portion of the distance of the first portion thereby providing a widened area of the runway extending less than the full length of said first portion so that planes landing on the first portion can promptly drift laterally on to the widened second portion of the runway, said second portion being a non-landing and non-takeoff area, an area at each end of said second portion and adjoining the said longitudinal side of the first portion, said areas at each end being of such construction as to be incompatible with aircraft landing, takeoff and taxiing, said areas at each end serving to define the length of said second widened area.

5. An airfield runway system adapted to facilitate the rapid landing and take-off of airplanes comprising a runway, said runway including a first portion of substantially uniform width and serving as an area for airplanes to land and take off, a second elongated portion contiguous with said first portion along a longitudinal, side thereof for a major portion of the distance of the first portion thereby providing a widened area of the runway extending less than the full length of said first portion so that planes landing on the first portion can promptly drift laterally on to the widened second portion of the runway, said second portion being disposed centrally with respect to the longitudinal length of the first portion, said second portion being a non-landing and non-takeoff area, an area at each end of said second portion and adjoining the said longitudinal side of the first portion, said areas at each end being of such construction as to be incompatible with aircraft landing, takeoff and taxiing, said areas at each end serving to define the length of said second widened area and the width of the first portion on which airplanes land and takeoff, a plurality of taxiways leading from the said second runway portion, said taxiways being disposed at oblique angles to the longitudinal axis of said runway whereby airplanes on the said second runway portion may turn off while still traveling at a substantial speed.

References Cited in the file of this patent

UNITED STATES PATENTS

| 1,903,847 | Wood, Jr. | Apr. 18, 1933 |
| 2,466,150 | Burt | Apr. 5, 1949 |
| 2,505,622 | McKee | Apr. 25, 1950 |

OTHER REFERENCES

Airport Design publication of CAA Apr. 1, 1944, pages 58–62 relied on.

Flight, July 10, 1953, pages 50–51.